United States Patent
Lynch

(10) Patent No.: US 11,509,064 B2
(45) Date of Patent: Nov. 22, 2022

(54) TRAVELING WAVE ARRAY HAVING LONGITUDINALLY POLARIZED ELEMENTS

(71) Applicant: GM GLOBAL TECHNOLOGY OPERATIONS LLC, Detroit, MI (US)

(72) Inventor: Jonathan J. Lynch, Oxnard, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 360 days.

(21) Appl. No.: 16/821,154

(22) Filed: Mar. 17, 2020

(65) Prior Publication Data

US 2021/0296781 A1 Sep. 23, 2021

(51) Int. Cl.
*H01Q 13/10* (2006.01)
*H01Q 13/22* (2006.01)
*H01Q 21/00* (2006.01)
*G01S 7/02* (2006.01)

(52) U.S. Cl.
CPC ........... *H01Q 21/005* (2013.01); *G01S 7/025* (2013.01)

(58) Field of Classification Search
CPC .. G01S 7/025; G01S 7/02; G01S 7/03; H01Q 1/32; H01Q 13/00; H01Q 13/10; H01Q 13/18; H01Q 13/22; H01Q 21/00; H01Q 21/005; H01Q 21/0043; H01Q 21/06; H01Q 21/08; H01P 1/17; H01P 1/16; H01P 1/165; H01P 1/171; H01P 5/02; H01P 3/12; H01P 3/123; H01P 5/024; H01P 5/12; H01P 5/18
See application file for complete search history.

(56) References Cited

U.S. PATENT DOCUMENTS

| | | | | |
|---|---|---|---|---|
| 4,638,323 A * | 1/1987 | Shnitkin | ........... | H01Q 21/0043 343/771 |
| 5,638,079 A * | 6/1997 | Kastner | ................ | H01Q 21/005 343/768 |
| 6,166,701 A * | 12/2000 | Park | ..................... | H01Q 21/005 343/756 |
| 8,604,990 B1 * | 12/2013 | Chen | ..................... | H01Q 13/10 343/771 |
| 11,171,399 B2 * | 11/2021 | Alexanian | ................. | G01S 3/40 |
| 11,196,171 B2 * | 12/2021 | Doyle | .................... | H01Q 13/20 |

FOREIGN PATENT DOCUMENTS

CN 204720551 U * 10/2015

OTHER PUBLICATIONS

Li et al., "Design and implementation of dual-frequency dual-polarization slotted waveguide antenna array for Ka-band application" IEEE Antennas and Wireless Propagation Letters vol. 13 (Jul. 9, 2014) pp. 1317-1320.

Park et al., "A slotted post-wall waveguide array with interdigital structure for 45/SPL deg/linear and dual polarization" IEEE Transactions on Antennas and Propagation vol. 53 No. 9 (Sep. 6, 2005) pp. 2865-2871.

* cited by examiner

*Primary Examiner* — Tho G Phan
(74) *Attorney, Agent, or Firm* — Cantor Colburn LLP

(57) ABSTRACT

An apparatus and method for orthogonal rotation of a radiation E-field polarization rely on a radiating element including an offset-ridge waveguide and a single-mode first ridge waveguide functionally adjacent to the offset-ridge waveguide.

20 Claims, 3 Drawing Sheets

TRAVELING WAVE ARRAY HAVING LONGITUDINALLY POLARIZED ELEMENTS

INTRODUCTION

This disclosure is related to high resolution radio detection and ranging (radar) systems. Radar systems are increasingly used to detect and track objects in a variety of applications. For example, vehicular radar systems may detect and track objects for a variety of situational awareness applications and autonomous and semi-autonomous vehicle control. In one type of radar system, traveling-wave imaging manifolds (TIM) have been proposed for use with one-dimensional (i.e., linear) arrays of waveguide slot antennas to desirably achieve E-field polarization along the array axis with individual slot antennas having slot orientations aligned orthogonally to the array axis and being spaced at or slightly greater than about one-half wavelength to achieve acceptable sidelobe levels and efficiency. However, achieving E-field polarizations orthogonal to the array axis in one-dimensional arrays of waveguide slot antennas is substantially limited by the incompatible performance and design parameters of such individual slot antennas. Simply reorienting individual slot antennas orthogonally within the array will, of itself, greatly attenuate radiated power unless one also moves the radiating slot from the narrow waveguide wall to the broad waveguide wall. However, maintaining the individual slot antenna spacing at or slightly greater than about one-half wavelength would require narrowing waveguide width to the point of cut off, also significantly attenuating the radiated power. Thus, the individual slot antenna spacing and slot width parameters are practically incompatible. Thus, it may be desirable in certain applications to provide for a one-dimensional array of waveguide slot antennas having longitudinal E-field polarizations orthogonal to the array axis which maintain individual slot antenna spacing at or slightly greater than about one-half wavelength and efficient radiated power.

SUMMARY

In one exemplary embodiment, a waveguide radiation structure may include a radiating element having an offset-ridge waveguide and a single-mode first ridge waveguide functionally adjacent to the offset-ridge waveguide.

In addition to one or more of the features described herein, the radiating element may include a second ridge waveguide functionally adjacent to the single-mode first ridge waveguide opposite the offset-ridge waveguide.

In addition to one or more of the features described herein, the structure may include a feed line coupled to the offset-ridge waveguide opposite the single-mode first ridge waveguide.

In addition to one or more of the features described herein, the structure may include a rectangular waveguide functionally adjacent the offset-ridge waveguide opposite a feed line.

In addition to one or more of the features described herein, the feed line may include one of a plurality of directionally alternating, parallel feed lines comprising a meandering feed guide.

In another exemplary embodiment, a method for orthogonal rotation of a radiation E-field polarization may include guiding a RF signal traveling through a feed guide, providing a rectangular waveguide coupled to the feed guide, providing an offset-ridge waveguide functionally adjacent to the rectangular waveguide opposite the feed guide, and providing a single-mode first ridge waveguide functionally adjacent to the offset-ridge waveguide opposite the rectangular waveguide.

In addition to one or more of the features described herein, the method may include providing a second ridge waveguide functionally adjacent to the single-mode first ridge waveguide opposite the offset-ridge waveguide.

In yet another exemplary embodiment, a waveguide radiation structure may include a meandering feed guide comprising a plurality of directionally alternating, parallel feed lines for guiding a RF signal along respective feed line axes and a one-dimensional array of radiating elements orthogonal to the feed line axes. Each radiating element may include an offset-ridge waveguide functionally coupled to a respective feed line and a single-mode first ridge waveguide functionally adjacent to the offset-ridge waveguide opposite the respective feed line.

In addition to one or more of the features described herein, each radiating element may include a second ridge waveguide functionally adjacent to the single-mode first ridge waveguide opposite the offset-ridge waveguide.

In addition to one or more of the features described herein, the structure may include a rectangular wave guide functionally adjacent to and between the offset-ridge waveguide and the respective feed line.

In addition to one or more of the features described herein, at least two rectangular waveguides may include differing heights.

In addition to one or more of the features described herein, at least two feed lines comprise differing lengths.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
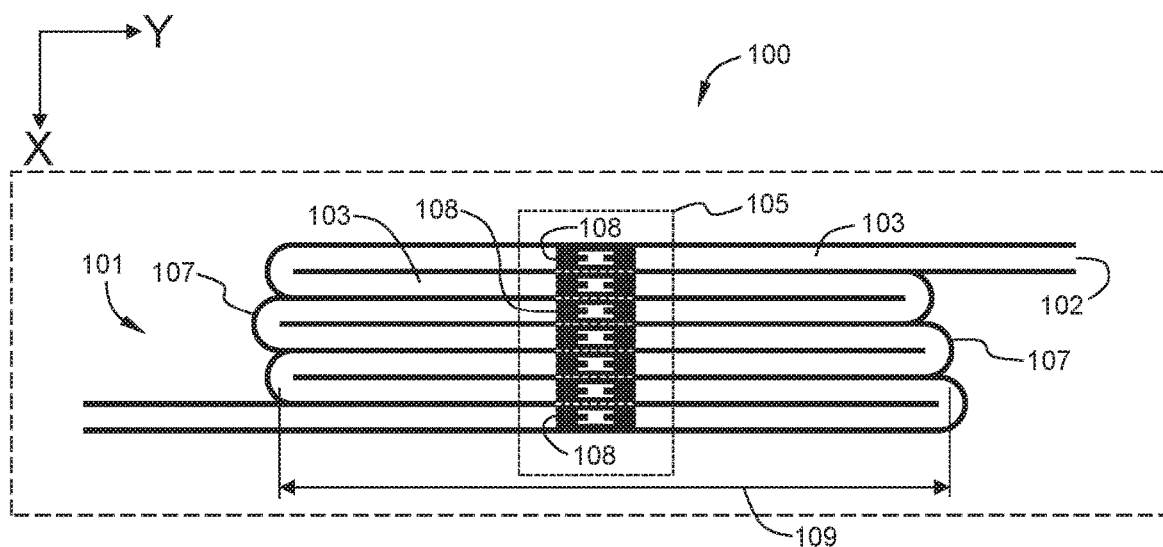
FIG. 1 illustrates an exemplary waveguide radiation structure, in accordance with the present disclosure.

The following description is merely exemplary in nature and is not intended to limit the present disclosure, its application or uses. Throughout the drawings, corresponding reference numerals indicate like or corresponding parts and features.

FIG. 1 schematically illustrates a waveguide radiation structure 100, for example for a radar system. X and Y directions are labeled on two dimensions of a three-dimensional axis system. The third dimension, Z, is understood to be out of the page. The structure 100 includes a traveling-wave imaging manifold (TIM) 101. In one embodiment, the manifold 101 may take the form of a meandering feed guide for guiding a radio frequency (RF) signal therethrough. A RF signal may be a signal originating at input 102 or received at input 102. The feed guide may include a plurality of feed lines 103 aligned along the Y axis and which are substantially parallel and directionally alternating (relative to the guided RF signal) at end limit switchbacks 107. In one embodiment, the end limit locations along the Y axis may vary thereby altering the effective lengths 109 of respective feed lines 103 defined therebetween. In one embodiment, all feed lines 103 may have the same length. In an alternate embodiment, at least two of the feed lines 103 have differing lengths. In yet another embodiment, no two feed lines 103 have the same length. In the latter embodiment, the feed guide may be characterized by a pseudorandom distribution of lengths of the feed lines 103. Structure 100 further includes a one-dimensional array 105 of individual radiating elements 108. The array 105 of individual radiating elements 108 is arranged along the X axis orthogonally to the feed line Y axis.

Figure 2:
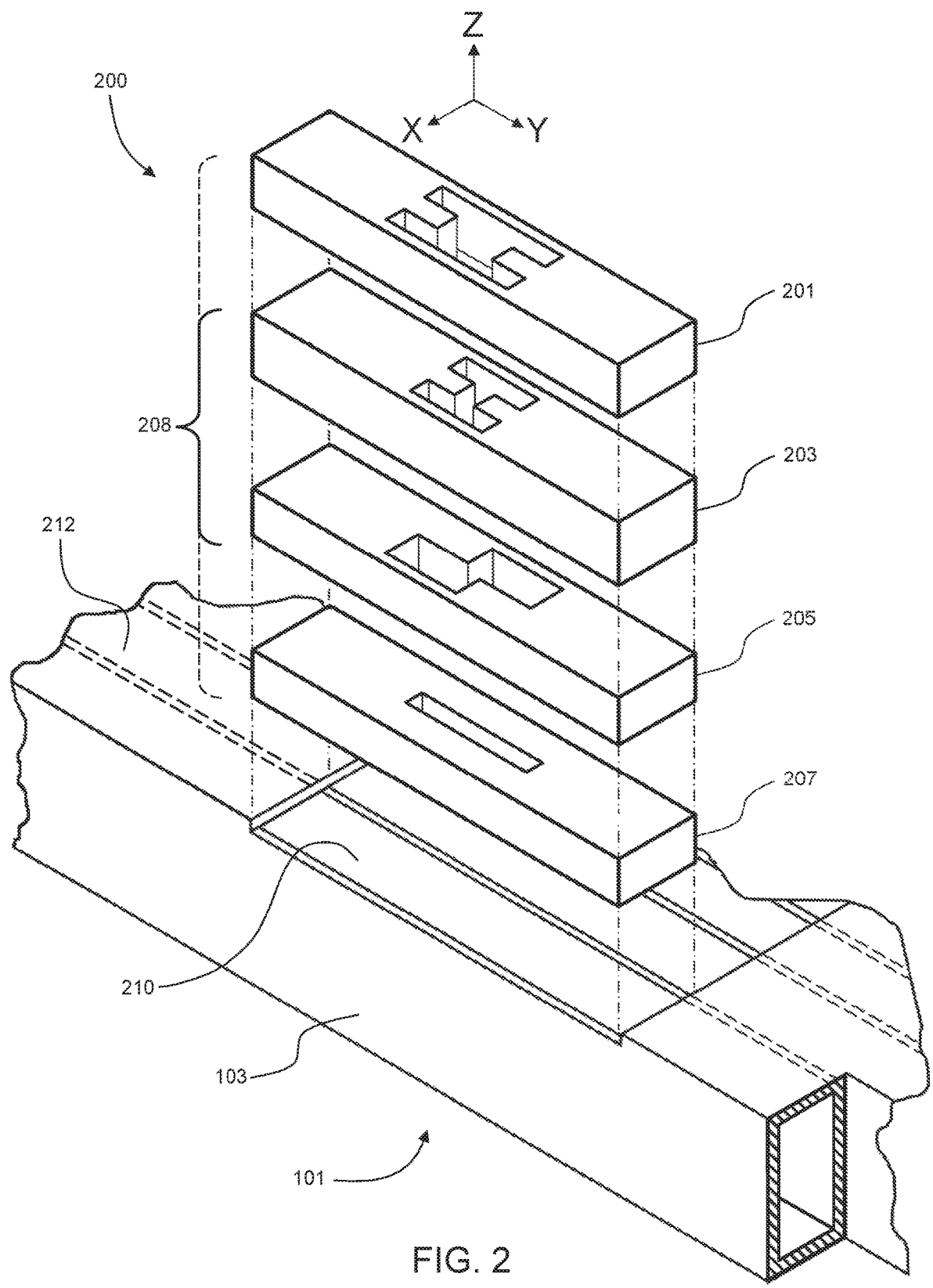
FIG. 2 shows exemplary waveguides, in accordance with the present disclosure.

With reference to FIG. 2, a partial, disassembled isometric view of a wave guide radiation structure 200 is illustrated. The structure 200 may include a traveling-wave imaging manifold 101 including a plurality of feed lines 103 as described herein with respect to FIG. 1. Each feedline 103 may be associated with a respective radiating element 208. Each radiating element 208 includes an offset-ridge waveguide 205 and a single-mode first ridge waveguide 203. Each radiating element 208 may further include a rectangular waveguide 207 and a second ridge waveguide 201. Second ridge waveguide 201 may be a single-mode ridge waveguide. Each waveguide 201-207 is characterized by an X axis orthogonal to feed lines 103, a Y axis aligned with the feed lines 103 and a Z axis aligned with the radiation direction. Each radiating element 208 is signally coupled to a respective feed line 103 through a respective feed aperture 210 in cover 212. All waveguides 201-207 are illustrated as separate components. It is understood that the waveguides 201-207 may be separate or integrated constructs. Waveguides 201-207 are functionally adjacent in the relative positions as illustrated. Waveguides are considered functionally adjacent where their Z axes are aligned and they are signally coupled. One having ordinary skill in the art recognizes that the waveguides 201-207 may be immediately adjacent or in spaced adjacency with intervening layers. For example, in one embodiment, an intervening layer may include an applied adhesive. In another embodiment, an intervening layer may include shims, spacers or other transitions. In another embodiment, an intervening layer may include a dielectric. In another embodiment, an intervening layer may include another waveguide. Rectangular waveguide 207 may be separate from or integrated with cover 212. An integrated rectangular waveguide 207 may displace the need for a separate feed aperture 210.

Figure 3:
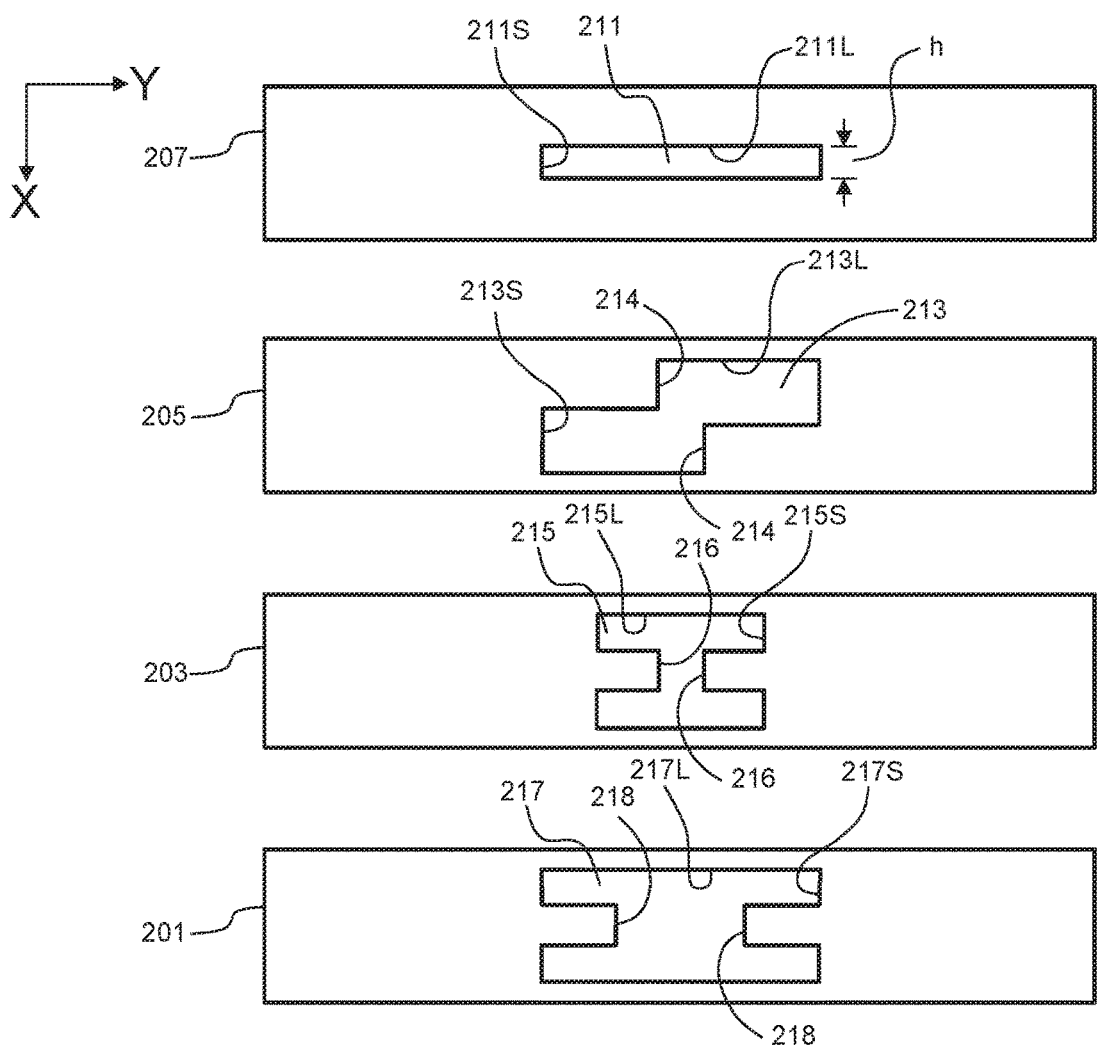
FIG. 3 shows an exemplary waveguide radiation structure in accordance with the present disclosure.
Figure 4:
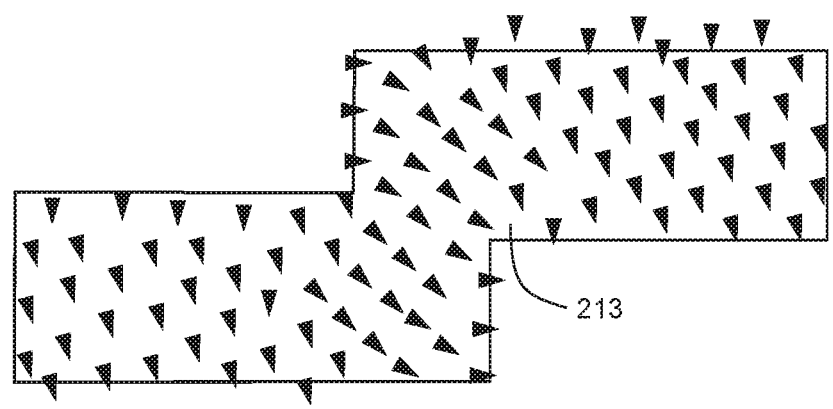
FIG. 4 shows an exemplary E-field polarization in an offset-ridge waveguide, in accordance with the present disclosure.

FIG. 3 illustrates each of the various waveguides 201-207 in plan view along the Z axis. Rectangular waveguide 207 includes aperture 211 having long side 211L and short side 211S with height (h). In one embodiment, the respective heights of each aperture 211 are equivalent. In an alternate embodiment, at least two of the apertures have differing heights. In yet another embodiment, no two apertures 211 have the same height. In the latter embodiment, the one-dimensional array 105 of individual radiating elements 108 may be characterized by respective rectangular waveguide 207 aperture heights resulting in substantially equivalent radiated power. Rectangular waveguide 207 propagates a signal having E-field polarization along the X axis. Offset-ridge waveguide 205 includes aperture 213 having long side 213L and short side 213S. Offset-ridge waveguide 205 includes ridges 214 offset with respect to the centerlines of both the short side 213S and the long side 213L. Thus, each ridge 214 occupies one of the opposite corners formed by an adjacent short side 213S and long side 213L. It is appreciated that each ridge 214 has two surfaces, one extending orthogonally from the short side 213S and one extending orthogonally from the long side 213L. In one embodiment, offset-ridge waveguide 205 is functionally adjacent to rectangular waveguide 207 opposite the feedline 103. Offset-ridge waveguide 205 radiates a signal having substantial E-field polarization that is intermediate the X axis and the Y axis as represented in FIG. 4. Single-mode first ridge waveguide 203 includes aperture 215 having long side 215L and short side 215S. Single-mode first ridge waveguide 203 includes ridges 216 protruding from the short sides 215S and parallel with the long sides 215L. Each ridge 216 is intermediate the long sides 215L. It is appreciated that each ridge 216 has three surfaces, two parallel surfaces extending orthogonally from the short side 215S and one extending orthogonally between the terminal ends of the two parallel surfaces. In one embodiment, single-mode first ridge waveguide 203 is functionally adjacent to offset-ridge waveguide 205 opposite rectangular waveguide 207. Second ridge waveguide 201 includes aperture 217 having long side 217L and short side 217S. Second ridge waveguide 201 includes ridges 218 protruding from the short sides 217S and parallel with the long sides 217L. Each ridge 218 is intermediate the long sides 217L. It is appreciated that each ridge 218 has three surfaces, two parallel surfaces extending orthogonally from the short side 217S and one extending orthogonally between the terminal ends of the two parallel surfaces. In one embodiment, single-mode first ridge waveguide 201 is functionally adjacent to single-mode first ridge waveguide 203 opposite offset-ridge waveguide 205. Second ridge waveguide 201 effects impedance matching of the low-impedance single-mode ridge waveguide 203 to the high-impedance radiation field.

It is thus appreciated that the disclosed arrangements of ridge waveguides 205,207 may be designed to achieve cutoff frequencies low enough to support the desired polarization with dimensional widths (X direction dimensions) at or slightly greater than about one-half wavelength of the signals of interest. The ridge waveguides 205,207 are fed by the offset-ridge waveguide 203 which couples energy from the feed line 103 into the desired ridge waveguide mode. The offset-ridge waveguide 203 is coupled to the feed line 103 by the rectangular waveguide 201 whose height (h) controls the amount of energy radiated by the element. The disclosed structure achieves efficient radiation in both desired polarizations while avoiding cutoff.

Complexity of the disclosed radiating element 208, including waveguides 201-207, may require component manufacturing and assembly. In one embodiment, the disclosed radiating element 208, including waveguides 201-207, may be machined from one or more metal billets, for example, copper, bronze, brass, aluminum, iron-nickel and other alloys. In other embodiments, manufacturing of the disclosed radiating element 208, including waveguides 201-207, may be accomplished through metal casting or sintering processes. In other embodiments, plastic injection molding may be employed in conjunction with metal coating or plating of active waveguide surfaces. In yet other embodiments, additive manufacturing techniques, including plastic and metal depositions, may be employed in the manufacture of the disclosed radiating element 208, including waveguides 201-207.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method or process may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A waveguide radiation structure, comprising:
   a radiating element comprising:
   an offset-ridge waveguide having a respective X axis orthogonal to a feed line, a respective Y axis aligned with the feed line, and a respective Z axis aligned with a radiation direction, the offset-ridge waveguide comprising an aperture having long sides and short sides and a pair of ridges offset with respect to centerlines of the short sides and the long sides, such that the ridges occupy opposite corners formed by adjacent short and long sides; and
   a single-mode first ridge waveguide having a respective X axis orthogonal to the feed line, a respective Y axis aligned with the feed line, and a respective Z axis aligned with the radiation direction, the first ridge waveguide comprising an aperture having long sides and short sides and a pair of ridges each protruding from the short sides, parallel with and intermediate the long sides, the first ridge waveguide functionally adjacent to the offset-ridge waveguide, wherein the respective Z axes are aligned and the offset-ridge waveguide and the first ridge waveguide are signally coupled.

2. The structure of claim 1, the radiating element comprising a second ridge waveguide having a respective X axis orthogonal to the feed line, a respective Y axis aligned with the feed line, and a respective Z axis aligned with the radiation direction, the second ridge waveguide functionally adjacent to the single-mode first ridge waveguide opposite the offset-ridge waveguide, wherein the respective Z axes are aligned and the offset-ridge waveguide, first ridge waveguide, and the second ridge waveguide are signally coupled.

3. The structure of claim 2, wherein the feed line is coupled to the offset-ridge waveguide opposite the single-mode first ridge waveguide.

4. The structure of claim 1, wherein the feed line is coupled to the offset-ridge waveguide opposite the single-mode first ridge waveguide.

5. The structure of claim 1, comprising a rectangular waveguide having a respective X axis orthogonal to the feed line, a respective Y axis aligned with the feed line, and a respective Z axis aligned with the radiation direction, the rectangular waveguide functionally adjacent the offset-ridge waveguide opposite the single-mode first ridge waveguide, wherein the respective Z axes are aligned and the rectangular waveguide, the offset-ridge waveguide and first ridge waveguide are signally coupled.

6. The structure of claim 5, wherein the feed line comprises one of a plurality of directionally alternating, parallel feed lines comprising a meandering feed guide.

7. A method for orthogonal rotation of a radiation E-field polarization, comprising:
   guiding a RF signal traveling through a feed guide;
   providing a rectangular waveguide coupled to the feed guide, the rectangular waveguide having a respective X axis orthogonal to a feed line of the feed guide, a respective Y axis aligned with the feed line, and a respective Z axis aligned with a radiation direction;
   providing an offset-ridge waveguide having a respective X axis orthogonal to the feed line, a respective Y axis aligned with the feed line, and a respective Z axis aligned with the radiation direction, the offset-ridge waveguide comprising an aperture having long sides and short sides and a pair of ridges offset with respect to centerlines of the short sides and the long sides, such that the ridges occupy opposite corners formed by adjacent short and long sides, the offset-ridge waveguide functionally adjacent to the rectangular waveguide opposite the feed guide; and
   providing a single-mode first ridge waveguide having a respective X axis orthogonal to the feed line, a respective Y axis aligned with the feed line, and a respective Z axis aligned with the radiation direction, the first ridge waveguide comprising an aperture having long sides and short sides and a pair of ridges each protruding from the short sides, parallel with and intermediate the long sides, the first ridge waveguide functionally adjacent to the offset-ridge waveguide opposite the rectangular waveguide;
   wherein the respective Z axes are aligned and the rectangular waveguide, the offset-ridge waveguide and first ridge waveguide are signally coupled.

8. The method of claim 7, comprising providing a second ridge waveguide having a respective X axis orthogonal to the feed line, a respective Y axis aligned with the feed line, and a respective Z axis aligned with the radiation direction, the second ridge waveguide functionally adjacent to the single-mode first ridge waveguide opposite the offset-ridge waveguide, wherein the respective Z axes are aligned and the rectangular waveguide, the offset-ridge waveguide, first ridge waveguide and the second ridge waveguide are signally coupled.

9. A waveguide radiation structure, comprising:
   a meandering feed guide comprising a plurality of directionally alternating, parallel feed lines for guiding a RF signal along respective feed line axes;
   a one-dimensional array of radiating elements orthogonal to the feed line axes;
   each radiating element comprising:
   an offset-ridge waveguide having a respective X axis orthogonal to a respective feed line, a respective Y axis aligned with the respective feed line, and a respective Z axis aligned with a radiation direction, the offset-ridge waveguide comprising an aperture having long sides and short sides and a pair of ridges offset with respect to centerlines of the short sides and the long sides, such that the ridges occupy opposite corners formed by adjacent short and long sides, the offset-ridge waveguide functionally coupled to the respective feed line; and a single-mode first ridge waveguide having a respective X axis orthogonal to the respective feed line, a respective Y axis aligned with the respective feed line, and a respective Z axis aligned with the radiation direction, the first ridge waveguide comprising an aperture having long sides and short sides and a pair of ridges each protruding from the short sides, parallel with and intermediate the long sides, the first ridge waveguide functionally adjacent to the offset-ridge waveguide opposite the respective feed line, wherein the respective Z axes are aligned and the offset-ridge waveguide and the first ridge waveguide are signally coupled.

10. The structure of claim 9, each radiating element comprising a second ridge waveguide having a respective X axis orthogonal to the respective feed line, a respective Y axis aligned with the respective feed line, and a respective Z axis aligned with the radiation direction, the second ridge waveguide functionally adjacent to the single-mode first ridge waveguide opposite the offset-ridge waveguide, wherein the respective Z axes are aligned and the offset-ridge waveguide, the first ridge waveguide and the second ridge waveguide are signally coupled.

11. The structure of claim 10, comprising a rectangular waveguide having a respective X axis orthogonal to the respective feed line, a respective Y axis aligned with the respective feed line, and a respective Z axis aligned with the radiation direction, the rectangular waveguide functionally adjacent to and between the offset-ridge waveguide and the respective feed line, wherein the respective Z axes are aligned and the rectangular waveguide, the offset-ridge waveguide, the first ridge waveguide and the second ridge waveguide are signally coupled.

12. The structure of claim 11, wherein at least two rectangular waveguides comprise differing heights.

13. The structure of claim 12, wherein at least two feed lines comprise differing lengths.

14. The structure of claim 11, wherein at least two feed lines comprise differing lengths.

15. The structure of claim 10, wherein at least two feed lines comprise differing lengths.

16. The structure of claim 9, comprising a rectangular waveguide having a respective X axis orthogonal to the respective feed line, a respective Y axis aligned with the respective feed line, and a respective Z axis aligned with the radiation direction, the rectangular waveguide functionally adjacent to and between the offset-ridge waveguide and the respective feed line, wherein the respective Z axes are aligned and the rectangular waveguide, the offset-ridge waveguide and the first ridge waveguide are signally coupled.

17. The structure of claim 16, wherein at least two rectangular waveguides comprise differing heights.

18. The structure of claim 17, wherein at least two feed lines comprise differing lengths.

19. The structure of claim 16, wherein at least two feed lines comprise differing lengths.

20. The structure of claim 9, wherein at least two feed lines comprise differing lengths.

* * * * *